Nov. 25, 1958     J. L. PEDRICK ET AL     2,861,722
PULP METER

Filed Dec. 7, 1954     4 Sheets-Sheet 1

INVENTORS.
JOHN L. PEDRICK
CHARLES W. DAWSON
BY
ATTORNEY.

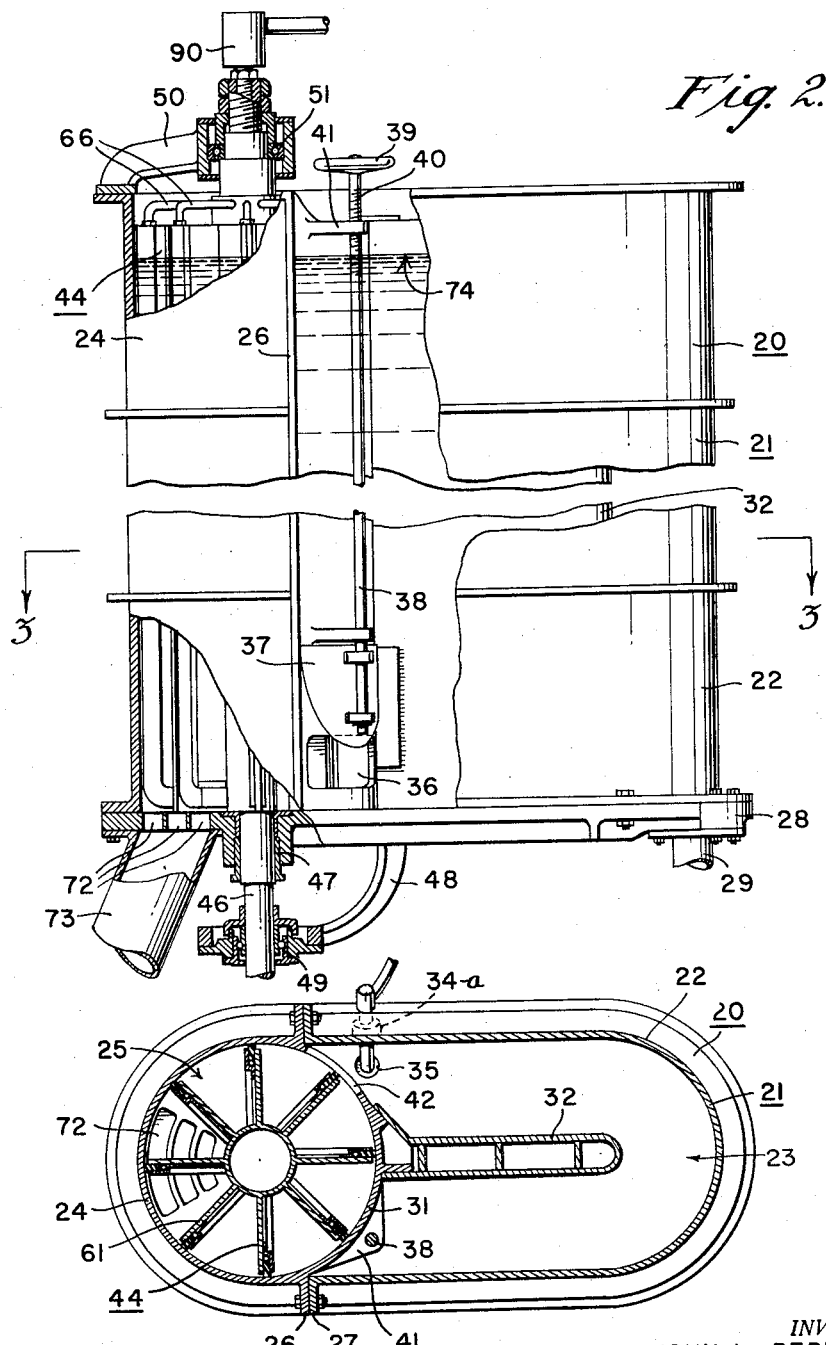

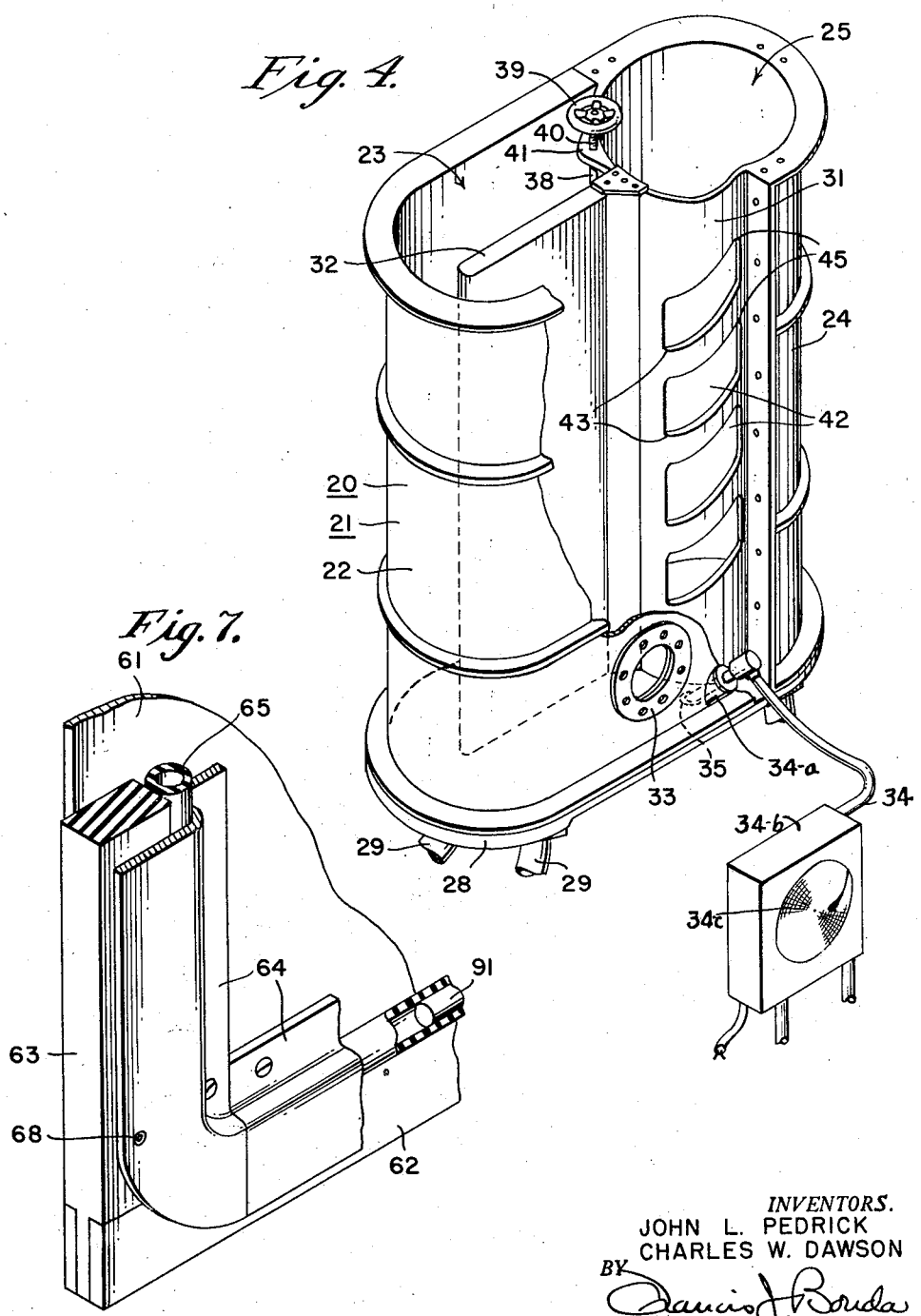

Nov. 25, 1958   J. L. PEDRICK ET AL   2,861,722
PULP METER
Filed Dec. 7, 1954   4 Sheets-Sheet 4
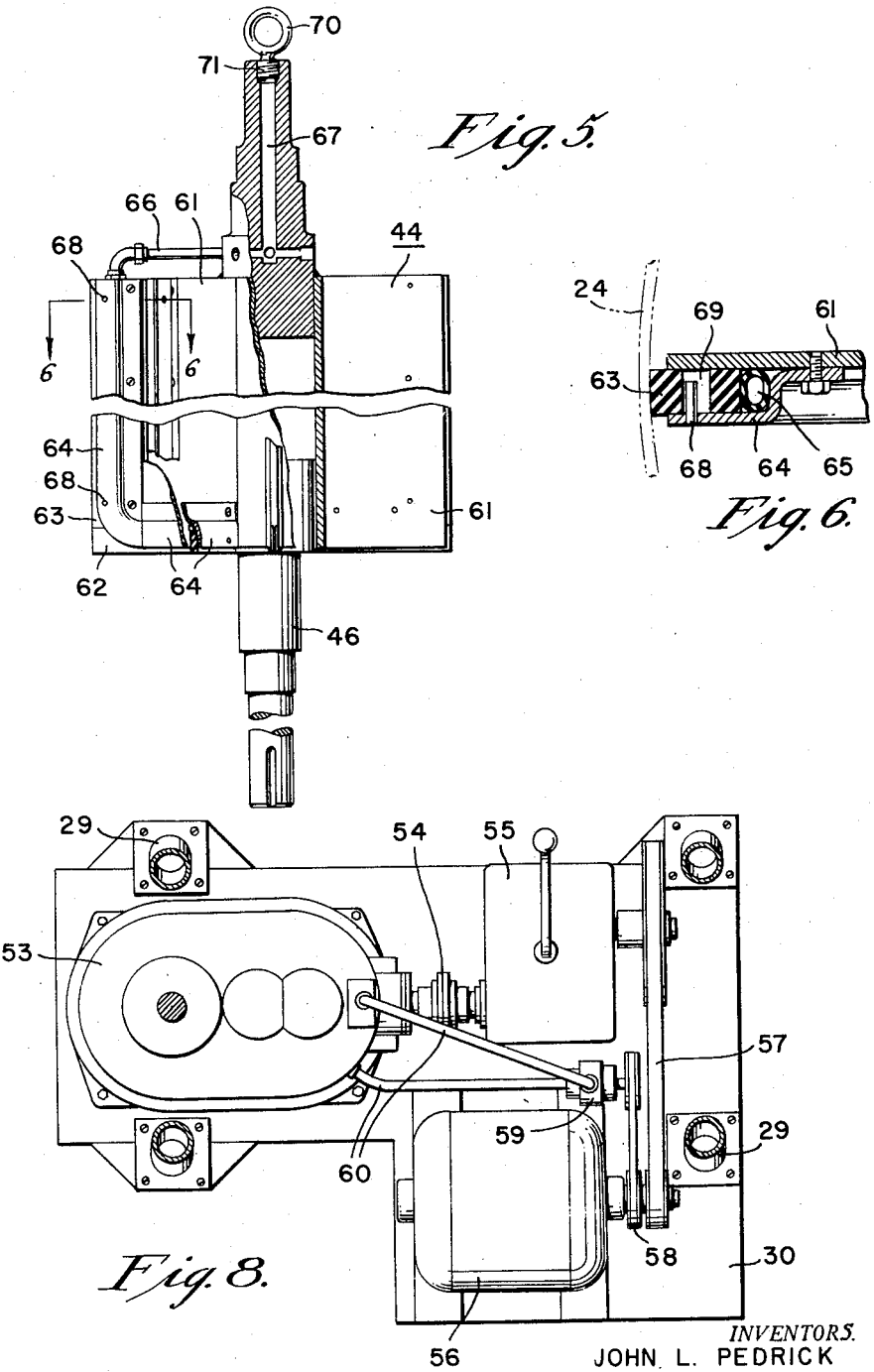

United States Patent Office 2,861,722
Patented Nov. 25, 1958

2,861,722
PULP METER

John L. Pedrick, Milmont Park, Pa., and Charles W. Dawson, Marblehead, Mass., assignors to Scott Paper Company, Chester, Pa., a corporation of Pennsylvania Application December 7, 1954, Serial No. 473,641

8 Claims. (Cl. 222—283)

The present invention relates to metering devices and flow control instruments and more particularly to a new and improved dispensing device of the trap-chamber type.

An object of the present invention is to provide a flow control instrument or meter for handling liquid, semi-liquid or viscous material such as paper-making pulp.

Another object of the present invention is to provide a fluid meter which positively and accurately controls the rate of the flow of fluid or semi-fluid material.

Another object of the present invention is to provide a new and novel instrument for controlling the rate-of-flow of fluids over a wide range of quantities per unit of time.

Another object of the present invention is to provide a fluid meter which has a plurality of controls for regulating the volume as well as the speed of discharge of the fluid therethrough, thus to achieve accurate and fine control over the rate-of-discharge of the fluid.

In addition, an object of the present invention is to provide a meter for regulating the flow of pulp to a pulp blending chest where it is mixed with other pulps supplied by similar meters prior to being delivered to a paper-making machine.

Further objects will be apparent by reference to the appended specification, claims and drawings.

For the purpose of illustrating the invention, there is shown in the accompanying drawings a form thereof which is at present preferred, although it is to be understood that the various instrumentalities of which the invention consists can be variously arranged and organized and that the invention is not limited to the precise arrangement and organization of the instrumentalities as herein shown and described.

In the manufacture of paper, especially on a Fourdrinier machine, the characteristics of the finished paper are, to a great extent governed by the type as well as the relative quantity of each type of pulp supplied to the headbox of the machine. The usual practice is to combine different types of pulp (i. e., sulphite pulp, sulphate pulp, groundwood pulp, broke and the like) in predetermined proportions in order to secure paper having the desired characteristics of fiber length, tensile strength, softness, absorbency, etc. In order that the proper proportions be maintained, it is necessary that the different types of pulp be metered in proper quantities to a mixing unit where they are combined prior to utilization in a paper-making machine.

In the past, the instruments used to control the flow of pulp (which at the time of measurement is in a liquid or semi-liquid state, having a consistency of approximately 3–5%) have been relatively unsatisfactory. Faster and larger paper-making machines have required the use of pulp-supply instruments of large capacity and the pumps heretofore used have not adequately handled large volumes of pulp with the required degree of accuracy. Furthermore, the pulp control units must quickly and easily respond to changing conditions during the paper-making process so as to vary the characteristics of the pulp with the changing conditions on the machine. Prior pulp meters have been unsatisfactory in so far as they did not afford the range or sensitivity required in modern paper-making operations.

The instrument of the present invention overcomes the disadvantages of the apparatus of the prior art because it provides a continuous flow control unit for large capacities having multiple control means which render the machine capable of accurately discharging liquid or semi-liquid material. A preferred form of the present invention is capable of handling pulp at a rate which may vary from as low as five tons per day up to 180 tons per day. The present invention is similar to the devices commonly called trap-chambers, but is unique inasmuch as it permits the handling of fluid rather than solid material, and also provides dual control means which render the machine capable of discharging pulp at the wide range of capacities referred to above.

With the foregoing in mind, the present invention may be more fully comprehended by referring to the attached drawings wherein like reference indicate like parts and wherein:

Figure 2 represents a fragmentary side elevational view, partly in section, of the meter shown in Figure 1.

Figure 3 represents a horizontal cross-sectional view taken generally along line 3—3 of Figure 2.

Figure 4 represents a perspective view, partly in section, of the metering cylinder and the level control chamber of the meter of Figure 1.

Figure 5 represents a side elevational view, partly in section, of the paddle wheel of the meter of the present invention.

Figure 6 represents a horizontal cross-sectional view taken generally along line 6—6 of Figure 5.

Figure 7 represents a fragmentary perspective view of a corner of one of the blades of the paddle wheel of the present invention.

Figure 8 represents a plan view of the base and drive-unit of the meter of the present invention, taken generally along line 8—8 of Figure 1.

Figure 1:
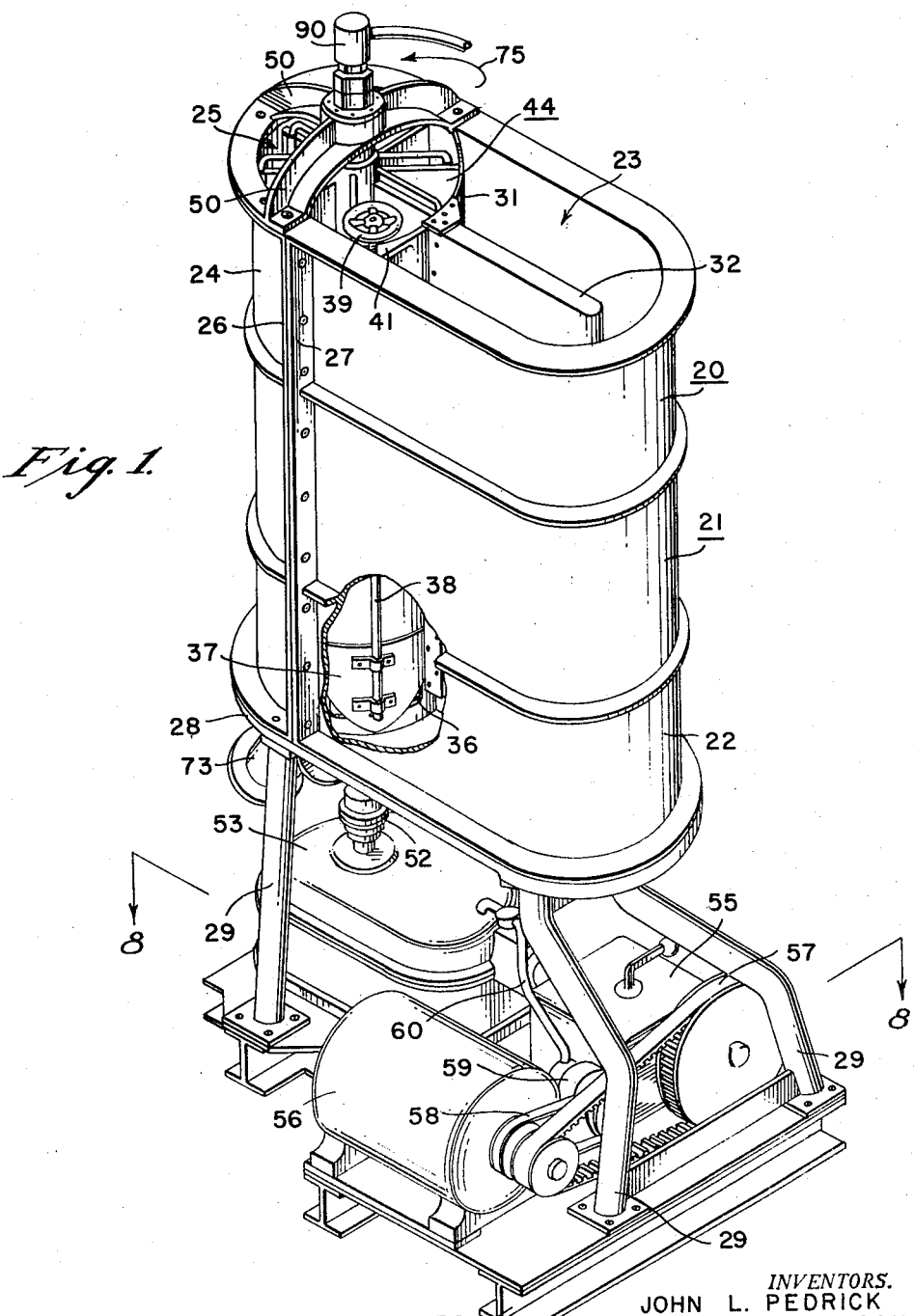
Figure 1 represents a perspective view of the meter of the present invention.

The meter 20 of the present invention includes a large compartmentized chamber or tank 21, formed by a first shell 22 which defines, in part, the first or level control chamber 23, and also a second shell 24 which defines, in part, the second or metering cylinder or trap chamber 25. The metering cylinder 25 is generally cylindrical and the shell 24 has suitable flanges 26 which interconnect with adjoining flanges 27 on the shell 22 to form the unitary tank 21.

The bottom of the tank 21 is formed by a base 28 interconnected in a fluid-tight manner to the lower edges of the shells 22 and 24. The tank 21 is supported by a plurality of legs 29 on a foundation 30, which foundation is also constructed and arranged to support the drive units hereinafter described.

The shells 22 and 24 in conjunction with the base 28 provide a compartmented, elongated, generally oval-shaped tank with the inner wall 31 of the shell 24 dividing the tank into two compartments—the level control chamber 23 and the metering cylinder 25.

The level control chamber 23 has disposed therewithin a vertical mid-feather 32 which extends along the center line of the chamber 23 outwardly from the wall 31 and terminates in spaced relation to the side wall of the shell 22, whereby to provide a generally U-shaped compartment.

The shell 22 has a fluid inlet port or opening 33 in one side thereof capable of accommodating a fluid inlet pipe (not shown) of suitable size and capacity. The shell 22 also supports a pressure-type liquid level controller and gauge 34–b, which has the outer end 34–a of a fluid-line or tube 34 disposed within the tank 21 closely adjacent a recess 35 in the base 28 so as to permit fluid pressure measurement at the level of the upper surface of the base 28 (i. e., at the very bottom of the tank 21). One form of pressure-type controller considered herein is the Mason-Neilan Model 62115 Pneumatic Set Pressure Controller which supplies a gas under pressure through the tube 34 to the tank 21. The back pressure in the tube 34 will vary with changes in the height of the fluid within the tank 21. This pressure is transmitted through the air column in the tube 34 to a pneumatic balance in the controller where pressure variations are converted to mechanical movements which control the valve admitting fluid to the tank 21. The pre-determined setting of the controller thus regulates the flow of fluid to the tank 21 and thereby controls the level or height of the fluid in the tank. This type of Mason-Neilan controller is the subject of U. S. Patent 2,585,347.

The wall 31 has a plurality of ports to permit the fluid to flow from the level control chamber 23 into the metering cylinder 25. In the wall 31 to one side of the mid-feather 32 is a port 36 having an adjustable gate 37 thereacross so as to vary the size of the port. The gate 37 is controlled through the rod 38 by the hand-wheel 39 which is supported by a threaded portion 40 in a boss 41 at the top of the side of the wall 31. Operation of the hand-wheel 39 controls the position of the gate 37 and thus permits the inlet port 36 to be increased or decreased, as desired, to accommodate materials of different viscosity and at different rates of flow.

In the wall 31 on the opposite side of the mid-feather 32 from the inlet port 36 are a plurality of kidney-shaped inlet ports 42. The ports 42 are disposed in the side wall 31 in such a manner that the members or blades 61 of the paddle wheel or carrier 44 first pass the lower ends 43 of the ports 42 and then move thereacross toward the upper ends 45. The rapid surge of fluid through the port 36 into the pie-shaped sections or compartments of the paddle wheel causes the pulsating effect and this pulsation is dampened by the controlled flow of fluid through the kidney-shaped ports 42 to bring the liquid up to its pre-determined level. Hence the fluid in the pie-shaped section adjacent to ports 42 is maintained at the same level as the liquid in the chamber 23 despite the tendency of the liquid level to change as a result of the surge of the fluid through the port 36.

The paddle wheel 44 is mounted within the metering cylinder 25 on the shaft 46 which rotates in a suitable fluid-tight bearing 47, and is supported at its lower end by the bracket 48 and thrust bearing 49, and at its upper end by the bracket 50 and bearing 51.

The lower end of the shaft 46 is connected through a suitable coupling 52 to a speed reduction unit 53 which, in turn, is connected through the coupling 54 to the speed control gear box 55. Motive power is supplied by the synchronous motor 56, which is connected to the gear box 55 through the positive action drive-belt or chain 57.

Also connected to the motor 56 through a drive-belt 58 is an oil pump 59 which circulates, through the pipes 60, the lubricant in the speed reduction unit 53.

The paddle wheel 44 has a plurality of vanes 61 extending radially from the shaft 46. Each of the vanes 61 terminates short of the side wall of the metering cylinder 25, and also short of the upper surface of the base 28. A radial wiper blade 62 and an axial wiper blade 63 are supported around the edge of each vane 61 by brackets 64. A tube 65 (having a plug 91 at its end) is interposed between the rear edge of the blades 62 and 63 and the back wall of the brackets 64, as shown particularly in Figure 7. These tubes (one for each vane) are connected at their upper ends through the pipes 66 to the central conduit 67 in the shaft 46. The conduit 67 is connected through a rotary seal 90 to a source of fluid under pressure (such as compressed air) so as to maintain the tube under pressure and force the blades 62 and 63 into sliding contact with the inner wall of the metering cylinder 25. The blades 62 and 63 are supported in the bracket 64 by a plurality of pins 68 which fit loosely into slots 69 in the blades and permit movement of the blades within the metering cylinder 25, but which prevent the blades from dropping away from the vanes 61 when the paddle wheel 44 is lifted from the metering cylinder 25 (as by the eye-ring 70 which can be inserted into the threaded portion 71 at the upper end of the conduit 67 in the shaft 46, when the rotary seal 90 is removed therefrom).

In the base 28 at the bottom of the metering cylinder 25 a number of openings or ports 72 connect the metering cylinder 25 to the discharge conduit 73.

The operation of the above-described apparatus is as follows:

The liquid (as, for instance, pulp of 3–5% consistency) is admitted to the control chamber 23 through the port 33 and rises therewithin until the liquid level 74 reaches an elevation sufficient to actuate the liquid level controller 34–b. The controller is pre-set for a desired "head" of liquid and, as described above, the fluid pressure in the tube 34 controls the flow of stock to the ports 33, whereupon the liquid in the tank 21 is maintained at the pre-determined level. The controller 34–b also has a recording gauge 34–c which remotely indicates the liquid-level in the tank 21. Operation of the motor 56 causes the paddle wheel 44 to rotate and the liquid passes through the inlet port 36 and the inlet ports 42 into the pie-shaped sections or compartments between the vanes 61. This allows the pie-shaped sections between the vanes to be filled to the same level as the fluid level in the control chamber 23.

Rotation of the paddle wheel in the direction indicated by the arrow 75 causes the fluid carried by it to be moved to a position directly above the discharge port or outlet 72 whereupon the compartments will be emptied. Continued rotation of the paddle wheel causes the empty compartments to be moved adjacent the openings 36 and 42, where they are filled and subsequently carried above the discharge port 72 where they are again emptied.

The rate of liquid discharge through the conduit 73 may be controlled by one or both of (a) the speed of rotation of the paddle wheel 44 and (b) the liquid level 74 within the metering cylinder 25 and the control chamber 23.

Because the liquid level can be closely controlled by the liquid level controller and gauge 34–b and the speed of rotation of the paddle wheel can be controlled accurately within a wide speed range by the motor 56, gear box 55 and speed reduction unit 53, very accurate and precise control of the rate of discharge of liquid may be afforded by use of the apparatus of the present invention.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having described the invention, what is claimed as new and desired to be protected by Letters Patent is the following:

1. A flow control instrument for regulating the rate-of-discharge of liquid from a liquid-source to a liquid-receptacle, said instrument including a trap chamber having a liquid inlet therein, means for controlling the liquid-level in the trap chamber, said trap chamber having a carrier therein with members defining at least one movable compartment, drive means for the carrier, an outlet in the trap chamber operatively connected to the liquid-receptacle, said outlet disposed within the trap chamber in such a position that at no time does one compartment of the carrier interconnect said outlet and the liquid-inlet to the trap chamber.

2. A flow control instrument for regulating the rate-of-discharge of liquid from a liquid-source to a liquid-receptacle, said instrument including a trap chamber and a reservoir operatively interconnected by a port, said reservoir being supplied with liquid from a liquid-source, means for controlling the liquid-level in the reservoir, said trap chamber having a carrier therein with members defining at least one movable compartment, means for containing the liquid in said compartment at the same level as the liquid-level within the reservoir, drive means for the carrier, an outlet in the trap chamber operatively connected to the liquid-receptacle, said outlet disposed within the trap chamber in such a position that at no time does one compartment of the carrier interconnect said outlet and the port between the reservoir and the trap chamber.

3. A flow control instrument for regulating the rate-of-discharge of liquid from a liquid-source to a liquid-receptacle, said instrument including a first chamber, means for controlling the liquid-level in said first chamber, a second chamber connected to said first chamber by at least one port through which liquid may pass from the first to the second chamber, at least one moving compartment in the second chamber, a discharge opening in the second chamber connected to the liquid-receptacle and disposed in spaced relation to said port whereby said compartment does not at any time interconnect said port and said discharge opening, drive means for moving said compartment and a speed control for said drive means.

4. A flow control instrument for regulating the rate-of-discharge of liquid from a liquid-source to a liquid-receptacle, said instrument including a first chamber, means for controlling the liquid-level in said first chamber, a second chamber connected to said first chamber by at least one port through which liquid may pass from the first to the second chamber, at least one rotating compartment in the second chamber, a discharge opening in the second chamber connected to the liquid-receptacle and disposed in spaced relation to said port whereby said compartment does not at any time interconnect said port and said discharge opening, drive means for rotating said compartment and a speed control for said drive means.

5. A flow control instrument for regulating the rate-of-discharge of liquid from a liquid-source to a liquid-receptacle, said instrument including a first chamber, means for controlling the liquid-level in said first chamber, a second chamber connected to said first chamber by at least one port through which liquid may pass from the first to the second chamber, at least one rotating compartment in the second chamber, revolving about a vertical axis, a discharge opening in the second chamber connected to the liquid-receptacle and disposed in spaced relation to said port whereby said compartment does not at any time interconnect said port and said discharge opening, drive means for rotating said compartment and a speed control for said drive means.

6. A flow control instrument having a plurality of controls for regulating the rate-of-discharge of liquid from a liquid-source to a liquid-receptacle, said instrument including a first chamber, means for controlling the liquid-level in said first chamber, a second chamber connected to said first chamber by at least one port through which liquid may pass from the first to the second chamber, at least one rotating compartment in the second chamber, a discharge opening in the second chamber connected to the liquid-receptacle and disposed in spaced relation to said port whereby said compartment does not at any time interconnect said port and said discharge opening, drive means for rotating said compartment and a speed control for said drive means.

7. A flow control instrument for regulating the rate-of-discharge of liquid from a liquid-source to a liquid-receptacle, said instrument including a first chamber, a liquid inlet for admitting liquid to said chamber from the liquid-source, means for controlling the liquid-level in said chamber, a second chamber connected to said first chamber by at least one port through which liquid may pass from the first to the second chamber, at least one rotating compartment in the second chamber, a discharge opening in the second chamber connected to the liquid-receptable and disposed in spaced relation to said port whereby said compartment does not at any time interconnect said port and said discharge opening, drive means for rotating said compartment and a speed control for said drive means, the means for controlling the liquid-level in the first chamber consisting of a pressure sensitive instrument operatively regulating the supply of liquid to the liquid inlet whereby the liquid-level within the first chamber may be controlled by a predetermined setting of the pressure sensitive instrument.

8. A flow control instrument for regulating the rate-of-discharge of liquid from a liquid-source to a liquid-receptacle, said instrument including a first chamber, a liquid inlet for admitting liquid to said chamber from the liquid-source, means for controlling the liquid-level in said chamber, a second chamber connected to said first chamber by at least one port through which liquid may pass from the first to the second chamber, at least one rotating compartment in the second chamber, a discharge opening in the second chamber connected to the liquid-receptacle and disposed in spaced relation to said port whereby said compartment does not at any time interconnect said port and said discharge opening, drive means for rotating said compartment and a speed control for said drive means, the means for controlling the liquid-level in the first chamber consisting of a pressure sensitive instrument operatively regulating the supply of liquid to the liquid inlet whereby the liquid-level within the first chamber may be controlled by a predetermined setting of the pressure sensitive instrument, the rate-of-discharge from said discharge opening being controlled by selective operation of the speed of rotation of the compartment and the height of the liquid-level within the first chamber.

References Cited in the file of this patent

UNITED STATES PATENTS

| | | |
|---|---|---|
| 121,416 | Pollock | Nov. 28, 1871 |
| 678,033 | Reeves | July 9, 1901 |
| 2,428,241 | Pootjes | Sept. 30, 1947 |